(12) United States Patent
Van Berkel

(10) Patent No.: US 7,286,118 B2
(45) Date of Patent: Oct. 23, 2007

(54) OBJECT SENSING

(75) Inventor: Cees Van Berkel, Hove (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 842 days.

(21) Appl. No.: 10/153,261

(22) Filed: May 22, 2002

(65) Prior Publication Data

US 2002/0190964 A1    Dec. 19, 2002

(30) Foreign Application Priority Data

Jun. 14, 2001    (GB)    ................... 0114456.7

(51) Int. Cl.
*G09G 5/00*    (2006.01)
(52) U.S. Cl. .................... 345/173; 178/18.06
(58) Field of Classification Search ................ 345/173, 345/174, 175, 176, 99, 206, 104; 178/18.01, 178/18.02, 18.03, 18.05, 18.06, 19.03, 18.04; 341/13; 349/151, 139, 5; 445/18, 33; 315/169.1, 315/169.2, 171; 715/864
See application file for complete search history.

(56) References Cited

U.S. PATENT DOCUMENTS

| | | | |
|---|---|---|---|
| 5,130,829 A | 7/1992 | Shannon | 359/59 |
| 5,574,805 A * | 11/1996 | Toba et al. | 385/3 |
| 5,828,365 A * | 10/1998 | Chen | 345/163 |
| 6,025,726 A | 2/2000 | Gershenfeld et al. | 324/671 |
| 6,140,863 A * | 10/2000 | Fujisawa | 327/540 |
| 6,172,667 B1 * | 1/2001 | Sayag | 345/175 |
| 6,239,788 B1 | 5/2001 | Nohno et al. | 345/173 |
| 6,292,001 B1 * | 9/2001 | Sasaki et al. | 324/662 |
| 6,657,616 B2 * | 12/2003 | Sims | 345/173 |
| 6,859,141 B1 * | 2/2005 | Van Schyndel et al. | 340/562 |
| 2003/0222857 A1 * | 12/2003 | Abileah | 345/173 |

FOREIGN PATENT DOCUMENTS

JP    06-051905    * 2/1994

OTHER PUBLICATIONS

J.R. Smith, Fiedl mice: extracting hand geometry from electric field measurements, IBM, vol. 35.*

* cited by examiner

*Primary Examiner*—Richard Hjerpe
*Assistant Examiner*—Abbas I. Abdulselam

(57) ABSTRACT

An integrated display and object sensing user input device is described. Display components and electric field sensing components are provided on a substrate. Also described is a sensing circuit for detecting current induced in a receiving electrode of an electric field sensing arrangement, wherein the sensing circuit employs two-phase charge accumulation. In operation, two effective circuit parts are selected alternately according to the phase of a voltage concurrently causing electric field emission, such that charge is accumulated in the same charge sense during operation of both effective circuit parts. Plural thin film electric field sensing circuits and electrodes may be arrayed to provide an object sensing array, usable as an input device.

23 Claims, 9 Drawing Sheets

OBJECT SENSING

The present invention relates to object sensing. The present invention is particularly suited to using object sensing to provide a user interface input. The present invention is also related to integrated display and user input devices, sometimes referred to as "touchscreen" devices.

A wide variety of user input devices or user interfaces for equipment such as computers, vending machines, and so on, are known. Some types of input devices, e.g. conventional keyboards, are based on mechanically operated switches activated by a user's direct action of applying pressure, usually with a finger. Other types of input devices are based on sensing a user's action in some other way. For example, a conventional computer mouse senses the movement of the mouse caused by the user.

Many types of equipment also comprise, or in use are connected to, a display device or display screen. A known type of display device is a liquid crystal display device. Very often the information being displayed on the display device is updated as a user inputs data, such as an instruction or some other information into the equipment (e.g. information input via a computer keyboard is displayed on the computer monitor).

In some equipment the display device and the user input device are implemented in the form of an integrated display and user input device. Such devices are often referred to as "touchscreen" devices. In these cases, a user presses the display, or touches the display, directly or with an object, or places an object or e.g. a finger close to the display, at a desired location on the display area. The location on the display area often represents a choice of inputs displayed on the screen.

One known technology for implementing such a touchscreen is "resistive touchscreen" technology in which two conductive layers are spaced apart and in parallel to the display screen, such that when a user applies pressure at a point the two conductive layers are pressed together. The location of the pressure, i.e. x and y measurement, is determined from measurement of potential drops in these directions. This technology requires the conductive layers to be overlaid over the display device, with resulting detrimental effects on display properties such as brightness and contrast, and with significant manufacturing implications.

Another known technology for implementing a touchscreen is "capacitive touchscreen" technology. A user's finger, for example, makes capacitive contact to a transparent conducting layer held at a low voltage and a small current flows through the user's finger and body to earth. This current is supplied by voltage sources at edges of the touchscreen and, by comparing the magnitude of these currents, the location of the touch point may be determined.

Other types of "touchscreen" involve the use of a so-called "electromagnetic pen" in which an inductor-capacitor resonant circuit in a "pen" device interacts by electromagnetic coupling with magnetic field loops positioned near, e.g. behind, a display screen, e.g. a liquid crystal panel. In some known devices the pen contains an active field generating circuit, in other examples the pen contains a passive circuit that is excited by fields generated by loops positioned near the display device, or in some cases by fields generated using drive lines of liquid crystal display devices. This approach requires the use of a specific piece of apparatus for the pen, i.e. a user cannot just use his finger.

In all the above combined display and user input devices (referred to as "touchscreen" devices, even if based on proximity rather than literal "touching") a key difference over separate display devices and input devices is that there is a direct one-to-one correlation between the displayed image and the input i.e. either a user directly selects a point of a displayed image, or, say, in the case of a "pen" input, the input is displayed in one-to-one correlation to the writing action, as in the case of traditional ink pen and paper writing.

Another sensing technology is electric field sensing, also known as quasi-electrostatic sensing. The use of electric field sensing to detect objects in 3-D space has been known for a long while, and is used for example in proximity sensors. In nature, the gnathomenu petersii fish uses electric field sensing to detect objects. In its simplest form, electric field sensing uses two electrodes. The first (transmitting) electrode is excited by application of an alternating voltage. A displacement current is thereby induced in the second (receiving) electrode due to capacitive coupling between the electrodes (i.e. effect of electric field lines). If an object is placed near the electrodes (i.e. in the field lines) some of the field lines are terminated by the object and the capacitive current decreases. If the current is monitored, the presence of the object may be sensed.

U.S. Pat. No. 6,025,726 discloses use of an electric field sensing arrangement as, inter-alia, a user input device for computer and other applications. The electric field sensing arrangement senses the position of a user's finger(s), hand or whole body, depending on the intended application. U.S. Pat. No. 6,025,726 further discloses the use of a plurality of receiving electrodes to enable distinction between near or far positioned objects.

Although the arrangement disclosed in U.S. Pat. No. 6,025,726 allows a wide range of non-contact 3-D sensing user inputs to be implemented, the circuitry disclosed for monitoring the small displacement current(s) is relatively bulky and complex, and includes a number of discrete amplifiers and other components. Essentially the displacement current is amplified, multiplied with a tapped-off version of the transmitting voltage, and then low-pass filtered to provide synchronous (also termed phase sensitive) current detection. Due to the complex circuitry, only a relatively small number of electrodes are used for sensing, relatively widely spaced apart, and in order to determine positional information a relatively large amount of post-processing is performed on the resulting somewhat limited basic input data. No constructional details are provided for the transmitting and receiving electrodes, but it is disclosed that they are connected to the circuitry using cables, which again is bulky and cumbersome.

Furthermore, although U.S. Pat. No. 6,025,726 discloses that when the electric field sensor is included as part of a device such as laptop computer a form of interaction with displayed buttons may be provided, nevertheless the sensors are formed in other parts of the computer housing and rely on the ability to fix positions relative to the screen, and as such the electric field sensing components (e.g. electrodes and circuitry) are not located or integrated in the display area of the display device.

A need therefore arises for an improved, e.g. less bulky or complex, circuit design for detecting the displacement current from the receiving electrode of an electric field sensing arrangement. It would also be desirable to implement an improved form of electrode construction or arrangement that may benefit from any such improved circuit arrangement. A need also arises for improved circuit design and/or electrodes that are more suitable for providing a larger number of electrodes in a given area such that a larger amount of input data may readily be achieved. A need also arises for a way of providing electric field sensing components (electrodes and/or circuitry) that are less bulky than known types such that they may be readily located or integrated in the display area of a device so as to provide a fuller "touch-screen" capability than the specific indirect possibility alluded to in U.S. Pat. No. 6,025,726.

In a first aspect, the present invention provides an integrated display and object sensing substrate, comprising a plate, and the following items provided on the plate: display components and electric field sensing components. The display components may include pixel electrodes and/or pixel switching devices, such as transistors, and/or driving lines. The electric field sensing components may include transmission electrodes and/or reception electrodes and/or joint transmission/reception electrodes. Some or all of the pixel electrodes may also serve as electric field sensing transmission, reception or joint transmission/reception electrodes.

The electric field sensing components may additionally or alternatively include circuit components for driving electric field transmission electrodes and/or circuit components for sensing induced currents in electric field reception electrodes. Other circuitry may be located external to the integrated display and object sensing substrate. Circuit components for sensing induced currents may preferably comprise thin film transistors. The circuit components for sensing induced currents preferably each further comprise capacitors, the capacitor and transistors forming a two-phase charge accumulation circuit.

In a second aspect, the present invention provides a sensing circuit for detecting current induced in a receiving electrode of an electric field sensing arrangement, wherein the sensing circuit employs two-phase charge accumulation. The circuit may be implemented using thin film technology or discrete components.

The circuit may provide, in operation, two effective circuit parts, selected alternately according to the phase of a voltage concurrently causing electric field emission, such that alternating charge formed at the electric field sensing electrode is alternately delivered through the two effective parts of the circuit to an accumulation arrangement, e.g. a single capacitor, to accumulate the charge in the same charge sense during operation of both effective circuit parts (since the current flow direction is synchronized with the phase of the electric field emission). This enables the desired electric field sensing charge from the induced electrode current to be accumulated over time. In contrast, erroneously formed currents are not synchronized with the phase of the electric field emission, and hence are substantially cancelled out.

In a third aspect, plural thin film electric field sensing circuits may be arranged with corresponding plural thin film electric field sensing electrodes in an array on a substrate to provide an object sensing array, usable as an input device.

In a fourth aspect, such an object sensing array may be interspersed amongst a pixel array of a display substrate, providing for example a display and user input device.

The above described and other aspects of the invention will be apparent from and elucidated with reference to the embodiments described hereinafter.

Embodiments of the present invention will now be described, by way of example, with reference to the accompanying drawings, in which.

Figure 11:
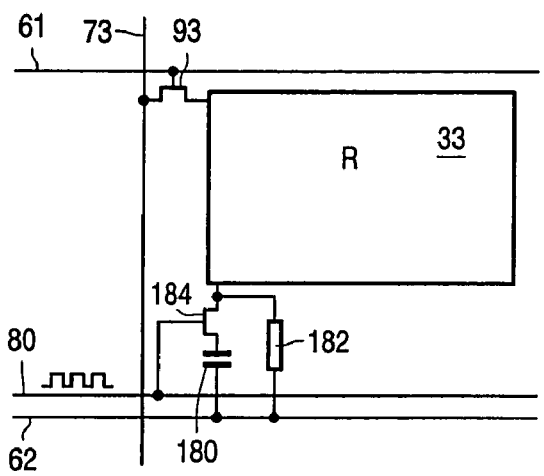
Figure 12:
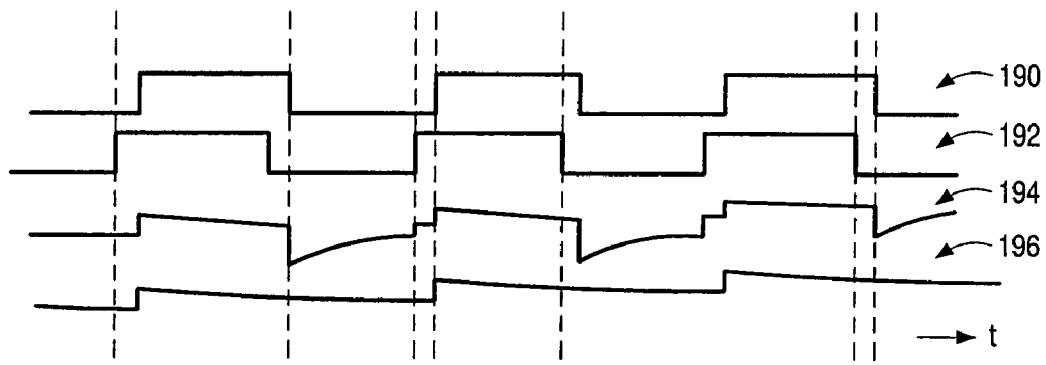
Figure 13:
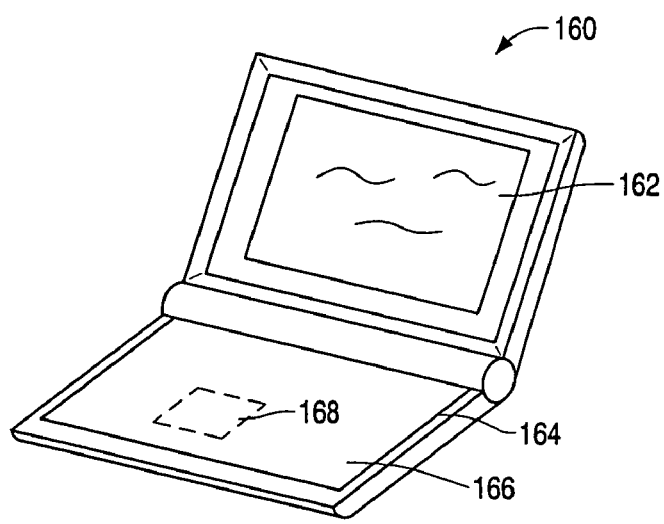

FIGS. 10a-10d schematically show other possible layouts of electric field sensing transmission electrodes, electric field sensing reception electrodes and pixel electrodes;

FIG. 11 is an illustration of another example of a two phase charge accumulation circuit;

FIG. 12 shows schematically a timing diagram to illustrate the operation of the circuit of FIG. 11; and FIG. 13 illustrates a laptop computer incorporating a stand-alone electric field sensing input device.

The first embodiment to be described is an integrated display and user input device, i.e. touchscreen device, in which the electric field sensing electrodes and circuit components are integrated in and distributed across a display device. Nevertheless, it is to be appreciated that in other embodiments the same electric field sensing components may be provided without display device components, thereby providing a stand-alone electric field sensing arrangement for use as an input device separate from a display.

Figure 1:
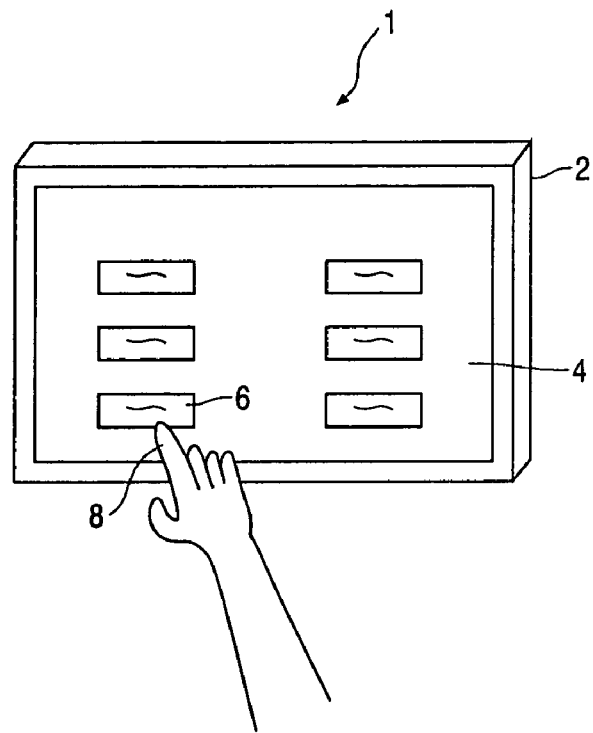
FIG. 1 is a schematic illustration (not to scale) of an integrated display and user input device.

FIG. 1 is a schematic illustration (not to scale) of an integrated display and user input device 1, which may be referred to as a touchscreen device, according to the first embodiment. The device 1 comprises a housing 2, with a display screen 4. On the display screen 4 is displayed an image comprising a plurality of icons representing virtual user buttons. In this example one such user button 6 is shown being selected by a user placing his finger 8 against the display screen within the area of the display screen at which the user button 6 is displayed.

Figure 2:
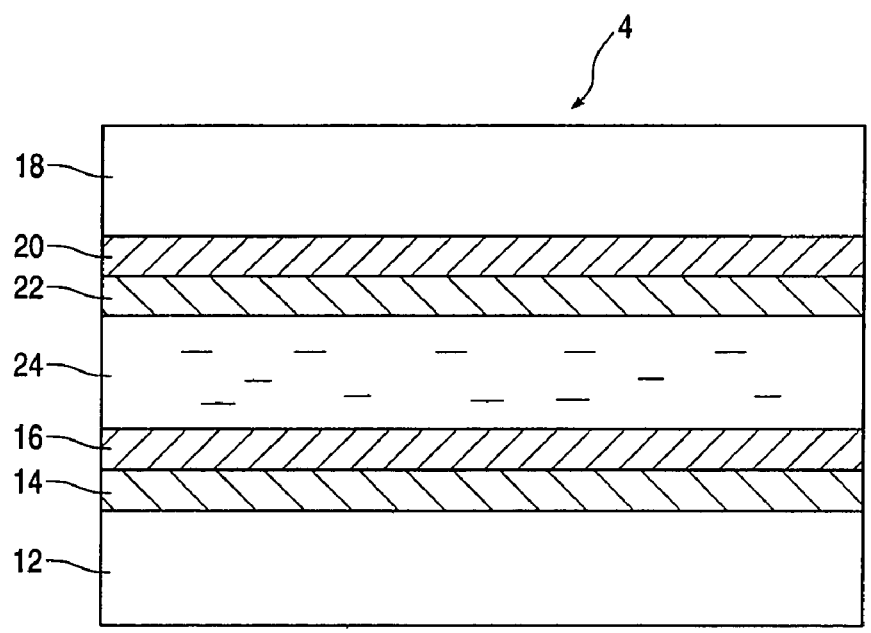
FIG. 2 is a schematic cross-sectional view (not to scale) of a display screen.

FIG. 2 is a schematic cross-sectional view (not to scale) of the display screen 4. In this embodiment the display is a liquid crystal display. The display screen 4 comprises a first glass plate 12 with an active matrix layer 14 disposed thereon. A liquid crystal orientation layer 16 is deposited over the active matrix layer 14. The display screen 4 further comprises a second glass plate 18, with a common electrode 20 thereon. The second glass plate 18 has a liquid crystal orientation layer 22 deposited over the common electrode 20. The second glass plate 18 is spaced apart from the first glass plate 12. A liquid crystal layer 24, comprising twisted nematic liquid crystal material, is disposed between the orientation layers 14, 22 of the two glass plates 12, 18. These and other details of the liquid crystal display device, except where otherwise stated below in relation to the additional inclusion of electric field sensing components, may be as per any conventional active matrix liquid crystal display device, and are in this particular embodiment the same as, and operate the same as, the liquid crystal display device disclosed in U.S. Pat. No. 5,130,829, the contents of which are contained herein by reference.

The active matrix layer 14 is formed from multiple thin film layers provided using conventional deposition and patterning techniques. The active matrix layer 14 comprises a plurality of display components. The term "display component" is used herein to refer to any item that contributes to the display functionality of the display screen 4. In this embodiment, the plural display elements include pixel electrodes, polysilicon thin film transistors (TFTs) (one for each pixel electrode), and driving lines, i.e. column and row driving lines.

In addition, the active matrix layer 14 comprises a plurality of electric field sensing transmission electrodes, a plurality of electric field reception electrodes, and electric field sensing circuitry (the circuitry comprising one capacitor and one TFT for each transmission electrode and four TFTs and one capacitor for each reception electrode, as will be explained in more detail below).

Figure 3:
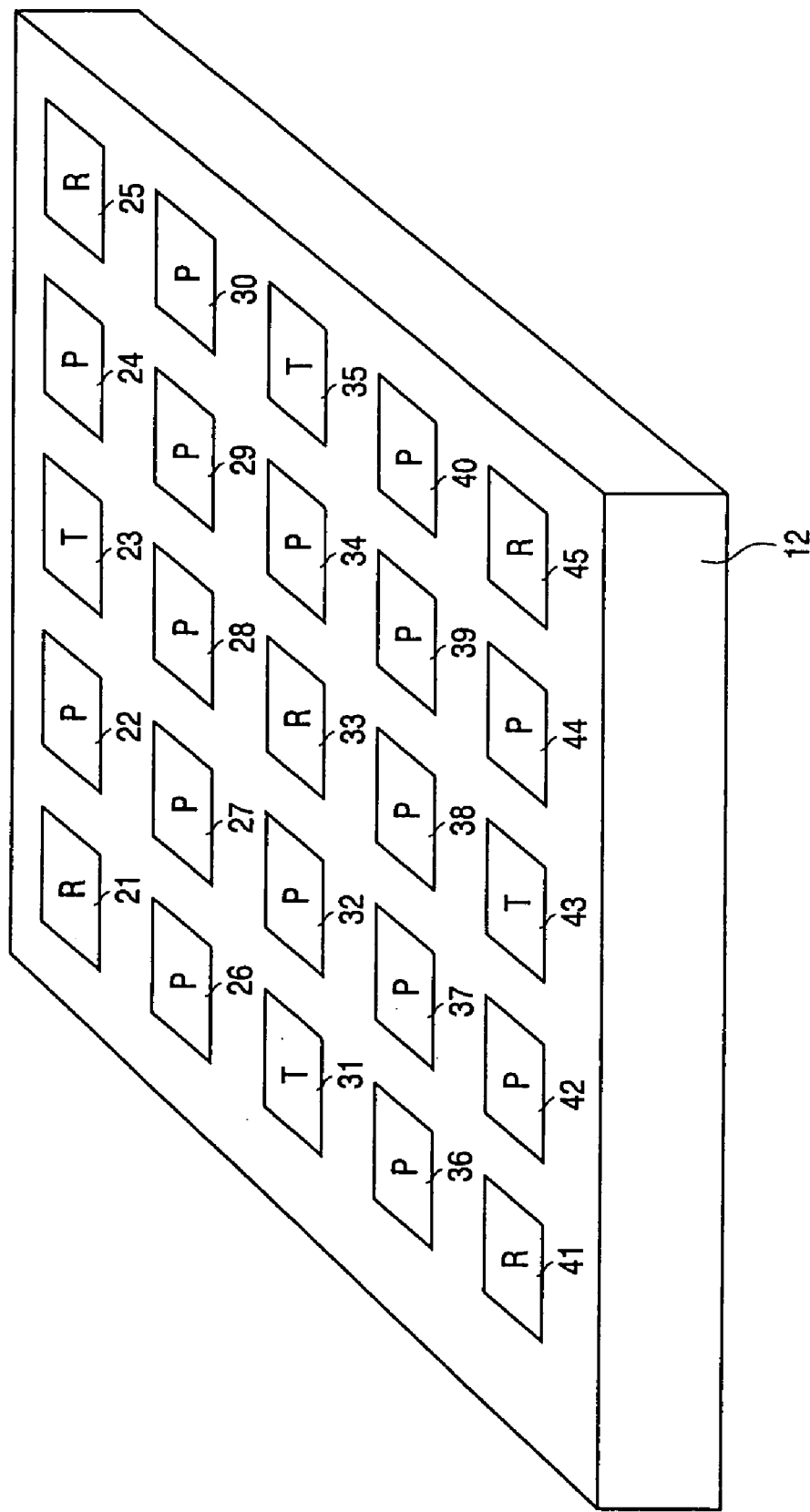
FIG. 3 is a schematic illustration (not to scale) showing pixel electrodes and electric field sensing electrodes positioned on a glass plate.

FIG. 3 is a schematic illustration (not to scale) showing the pixel electrodes and electric field sensing electrodes positioned on the glass plate 12. For clarity, the TFTs, capacitors and driving lines are not shown. In this embodiment the pixel electrodes, the electric field sensing transmission electrodes and the electric field sensing reception electrodes are all formed from the same layer of conductor, and are equally spaced and equally sized. A large number of these pixel electrodes and electric field sensing electrodes (e.g. 800×600=480,000) are provided on the glass plate 12, but for clarity only a small proportion of these, in the form of a 5×5 array of electrodes 21-45, are shown in FIG. 3.

The electrodes 21-45 are distributed between pixel electrodes (indicated by the letter "P"), electric field sensing transmission electrodes (indicated by the letter "T") and electric field sensing reception electrodes (indicated by the letter "R") as follows. In alternate rows, electric field sensing transmission electrodes are positioned in every fourth electrode position, staggered between consecutive alternate rows, thus providing electric field sensing transmission electrodes 23, 31, 35, 43 as shown in FIG. 3. In the same alternate rows, electric field sensing electrodes are also positioned in every fourth electrode position, staggered between consecutive alternate rows and also with respect to the electric field sensing transmission electrodes, thus providing electric field sensing reception electrodes 21, 25, 33, 41, 45 as shown in FIG. 3. The remaining electrodes are pixel electrodes, e.g. pixel electrodes 22, 24, 26-30, 32, 34, 36-40, 42, 44 as shown in FIG. 3.

The respective TFT (not shown) for each pixel electrode 22, 24, 26-30, 32, 34, 36-40, 42, 44 is deposited in the vicinity of that pixel electrode, in conventional fashion. The respective capacitor and TFT (not shown) for each electric field sensing transmission electrode 23, 31, 35, 43 are likewise deposited in the vicinity of that electric field sensing transmission electrode; the respective capacitor and four TFTs (not shown) for each electric field sensing reception electrode 21, 25, 33, 41, 45 are likewise deposited in the vicinity of that electric field sensing reception electrode.

In order to allow appreciation of the function and purpose of the above mentioned electric field sensing circuitry (which will be described in further detail below), an outline account will now be given, with reference to FIG. 4, of the fundamental operation of electric field sensing, using by way of example the electric field generated by the electric field sensing transmission electrode 31 and received by the electric field sensing reception electrode 33.

Figure 4:
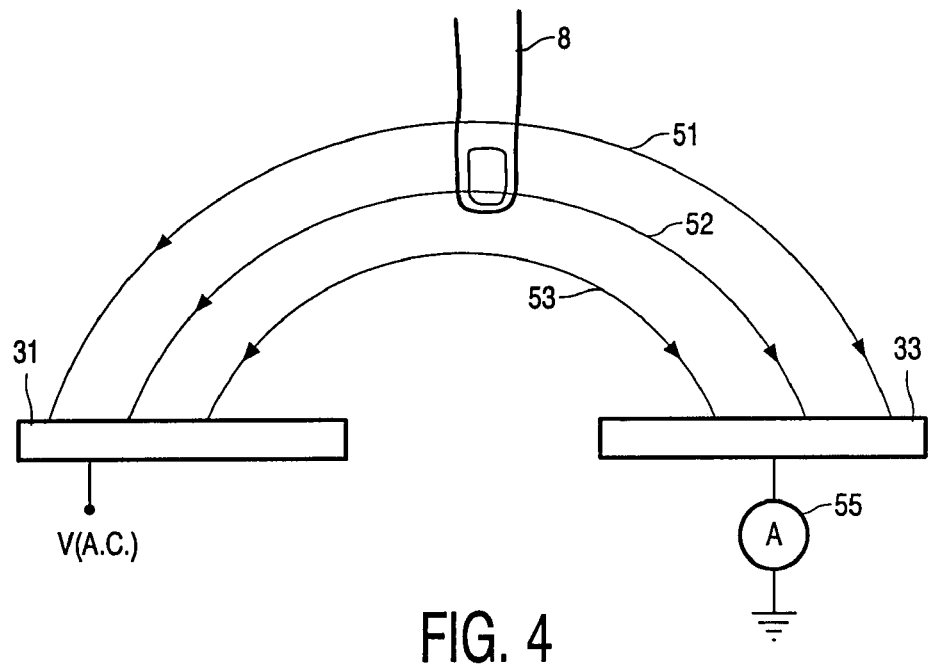
FIG. 4 is a diagram referred to in explanation of the fundamental operation of electric field sensing.

Referring to FIG. 4, when an alternating voltage is applied to the transmission electrode 31, electric field lines are generated, of which exemplary electric field lines 51, 52, 53 pass through the electric field sensing reception electrode 33. When the electric field sensing reception electrode 33 is connected to earth, the field lines 51, 52, 53 induce a small alternating current which may be measured by means of circuitry, represented in simple conceptual fashion here by a "nominal" ammeter 55 (in the prior art complex circuitry is required to handle the very low current levels involved and to tie in with the phase of the original generating alternating voltage applied to the electric field sensing transmission electrode 31, and in this embodiment a circuit comprising a capacitor and four TFTs is employed, as will be described in more detail below).

When an object, in this case the user's finger 8, is placed in the vicinity of the two electrodes 31, 33, the object terminates those field lines (in the situation shown in FIG. 4, field lines 51 and 52) that would otherwise pass through the space occupied by the object, thus reducing the current flowing through the nominal ammeter 55. Thus the current level at the nominal ammeter 55 may be used as a measure of the presence of an object in the vicinity of the two electrodes 31, 33. If a single electric field sensing receiving electrode lies in the field lines of more than one transmission electrode, then the combined effect of current changes in plural receiving electrodes may be processed, in any suitable fashion, to determine how the object position is to be characterized by the application using this input information.

Referring back to FIG. 2, in order for a user's finger to be placed in the vicinity of the electric field sensing electrodes of the active matrix layer 14, the display screen 4 is arranged such that the user is positioned to the active matrix 14 side of the display screen 4 rather than to the common electrode 20 side of the display screen 4.

Figure 5:
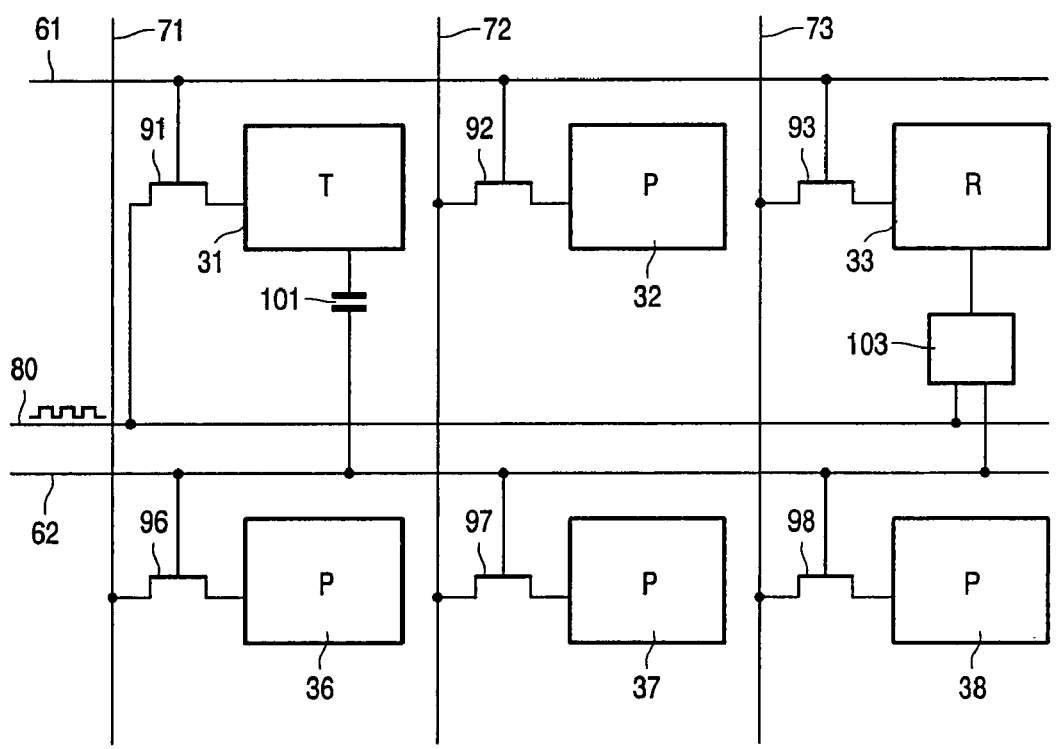
FIG. 5 is a circuit diagram representing electrical connections for an electric field sensing transmission electrode, an electric field sensing reception electrode, and four pixel electrodes.

Returning now to description of the active matrix layer 14, FIG. 5 is a circuit diagram representing, by way of example, the electrical connections for the electric field sensing transmission electrode 31, the pixel electrode 32, the electric field sensing reception electrode 33, and the further pixel electrodes 36, 37, 38.

In conventional fashion, row drive lines 61 and 62 are provided for each row of pixel electrodes, and column drive lines 71, 72 73 are provided for each column of pixel electrodes. Each pixel electrode 32, 36, 37, 38 is coupled to its corresponding row and column line across a respective n-type TFT 92, 96, 97, 98, the gates of the TFTs being connected to the corresponding row drive line. In conventional fashion, the TFTs 92,96,97,98 each have two further terminals (hereinafter referred to as a first terminal and a second terminal) in addition to the gate. The first terminal of each of TFTs 92,96,97,98 is connected to the corresponding column drive line, and the second terminal of each of TFTs 92,96,97,98 is connected to the corresponding pixel electrode 32,36,37,38, as shown. The pixel electrodes 32,36,37, 38 are typically driven alternately to positive and negative voltages at alternate image fields, and hence the first and second terminals each function alternately as the source and the drain of their TFT, i.e. when the first terminal serves as the source, the second terminal serves as the drain, and vice versa.

Respective n-type transistors 91, 93 are also provided for the electric field sensing transmission electrode 31 and the electric field sensing reception electrode 33. As shown, the TFT 93 is coupled to the electric field sensing receiving electrode 33, column drive line 73 and row drive line 61 in the same way as if that electrode were a pixel electrode.

The TFT 91 is coupled in a slightly different manner as follows. The gate of TFT is connected to the row drive line in the same way as for a pixel, and the second terminal is connected to the electrode in the same way as for a pixel electrode. However, the first terminal of the TFT 91 is connected to an additional driving line, which may be termed a phase line 80. One such phase line is provided for each row of electrodes that includes electric field sensing transmission and/or reception electrodes. In operation an alternating voltage is applied to the phase line 80, as will be explained in more detail below.

A capacitor is also provided between the electric field sensing transmission electrode 31 and a row drive line 62 (row drive line 62 being provided in conventional manner for the next row of pixel electrodes).

A current processing circuit 103 is provided for sensing the current from the electric field sensing reception electrode. The current processing circuit 103 is connected to the electric field sensing reception electrode 33, the phase line 80 and the row drive line 62.

Figure 6:
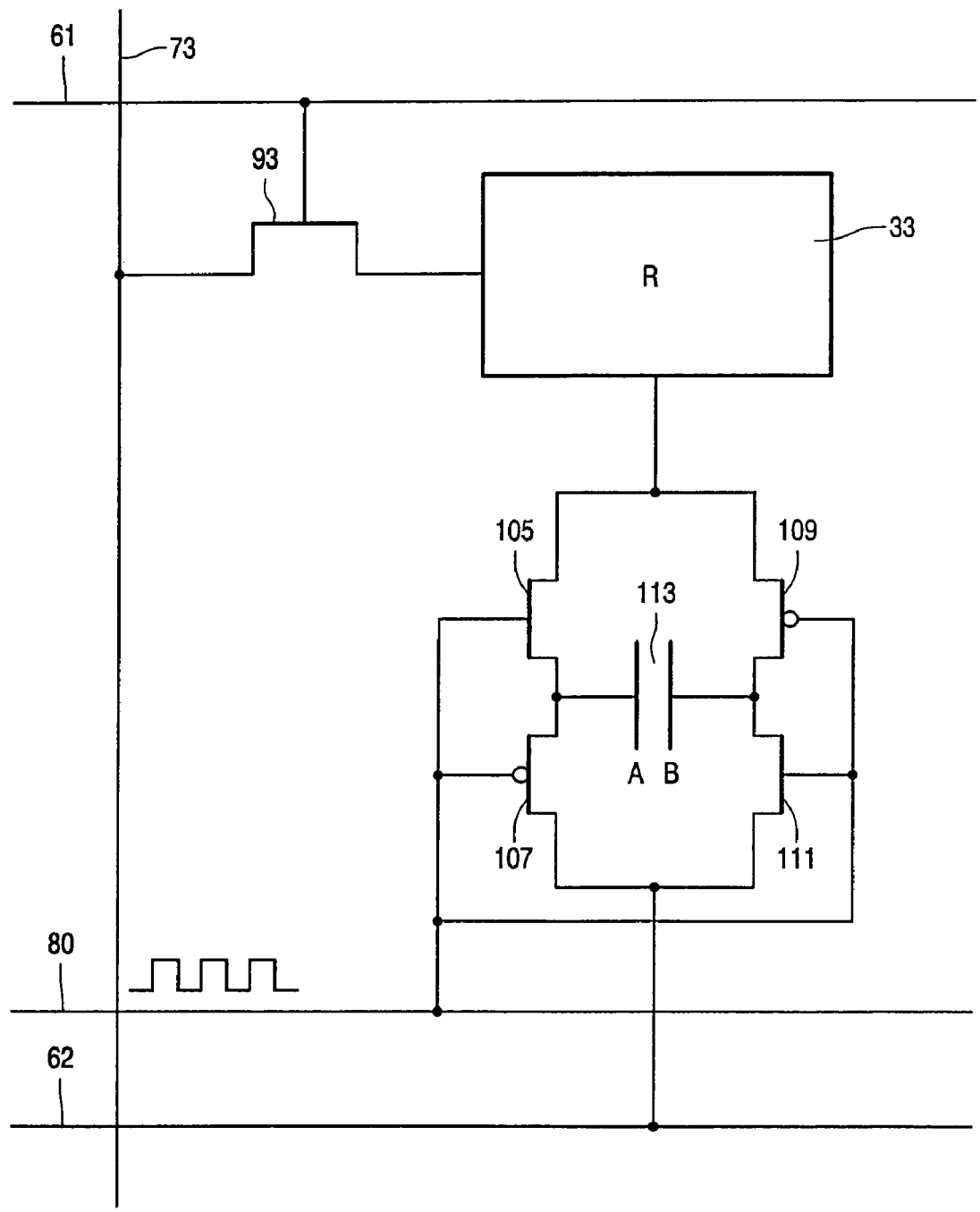
FIG. 6 shows, for the electric field sensing reception electrode of FIG. 5, the same items as shown in FIG. 5, except that a current processing circuit is shown in full.

FIG. 6 shows, for the electric field sensing reception electrode 33, the same items as shown in FIG. 5, except that the current processing circuit 103 is shown in full. The current processing circuit 103 comprises two n-type TFTs, hereinafter referred to as a first n-type TFT 105 and a second n-type TFT 111; two p-type TFTs, hereinafter referred to as a first p-type TFT 107 and a second p-type TFT 109; and a capacitor 113.

The circuit components are connected as follows. The gates of all four TFTs 105, 107, 109,111 are connected to each other and to the phase line 80. The TFTs 105,107,109, 111 each have, in conventional fashion, two further source/drain terminals (hereinafter referred to as a first and a second terminal) in addition to the gate. In operation, one of the source/drain terminals functions as the source of the TFT and the other of the source/drain terminals functions as the drain of the TFT. The question of which source/drain terminal serves as the source and which serves as the drain at any particular moment is determined by the polarity of the applied voltage at that moment. The first terminal of the first n-type TFT 105 and the first terminal of the second p-type TFT 109 are connected to each other and to the electric field sensing reception electrode 33. The second terminal of the first n-type TFT 105 and the first terminal of the first p-type TFT 107 are connected to each other and to one side (hereinafter referred to as side A) of the capacitor 113. The second terminal of the first p-type TFT 107 and the second terminal of the second n-type TFT 111 are connected to each other and to the row drive line 62. The second terminal of the second p-type TFT 109 and the first terminal of the second n-type TFT 111 are connected to each other and to the other side (hereinafter referred to as side B) of the capacitor 113.

In summary, the current processing circuit 103 operates by effectively operating as two separate circuit parts. The first circuit part comprises the first n-type TFT 105, the capacitor 113 and the second n-type TFT 111. The second circuit part comprises the first p-type TFT 107, the capacitor 113, and the second p-type TFT 109 (note the capacitor 113 is shared by both circuit parts). The two circuit parts are activated alternately in response to the positive and negative cycles of the alternating voltage supplied on the phase line 80. Each of the two circuits accumulates charge (from the electric field sensing reception electrode 33) at the capacitor 113. This charge is accumulated in the same charge sense at the capacitor for each of the two circuits, thus accumulating a relatively large total charge from the individual relatively low small charges accumulated for each cycle of the alternating voltage.

Figure 7:
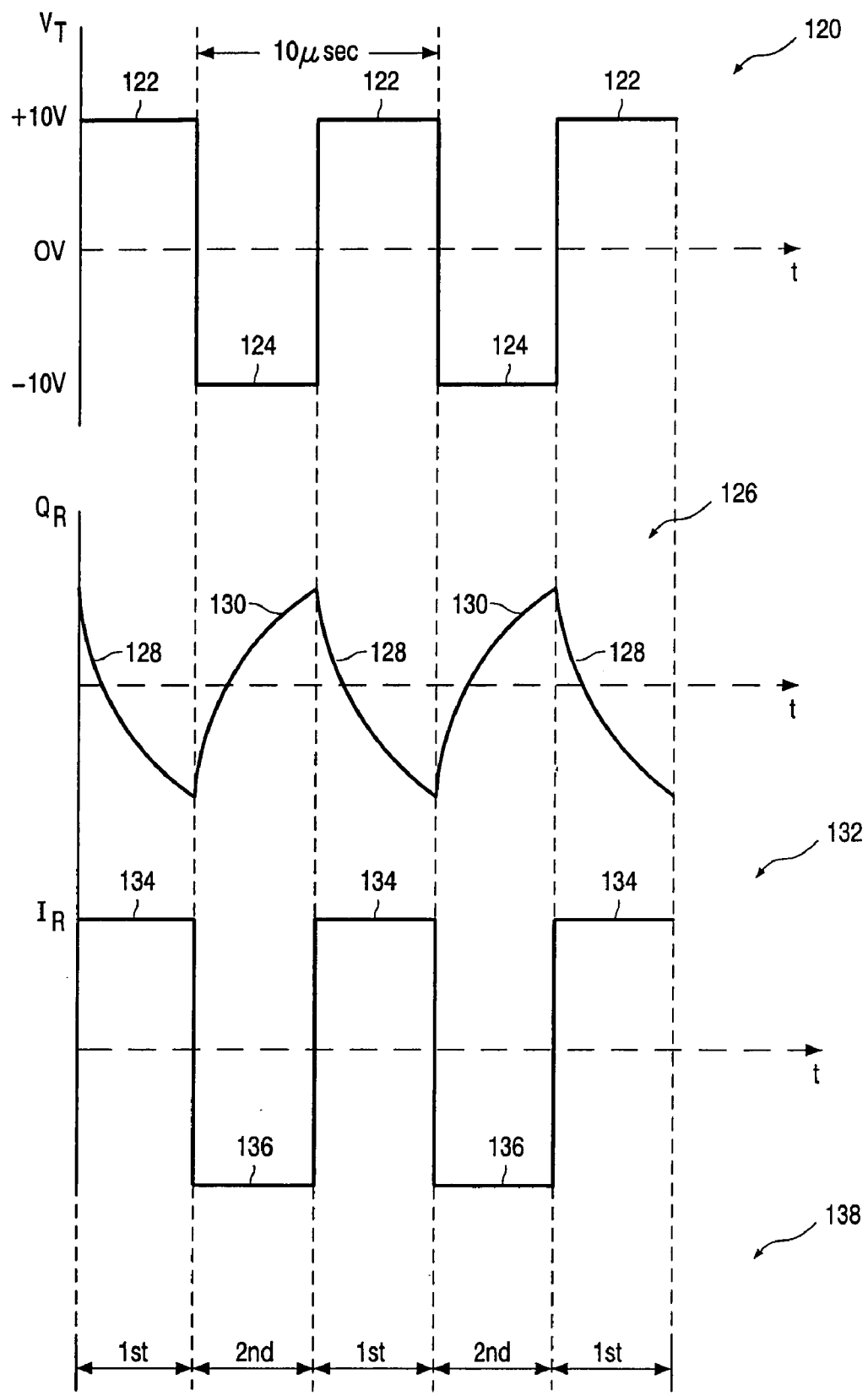
FIG. 7 illustrates qualitatively an alternating voltage supplied on a phase line and resulting responses at an electric field sensing reception electrode and a current processing circuit.
Figure 8:
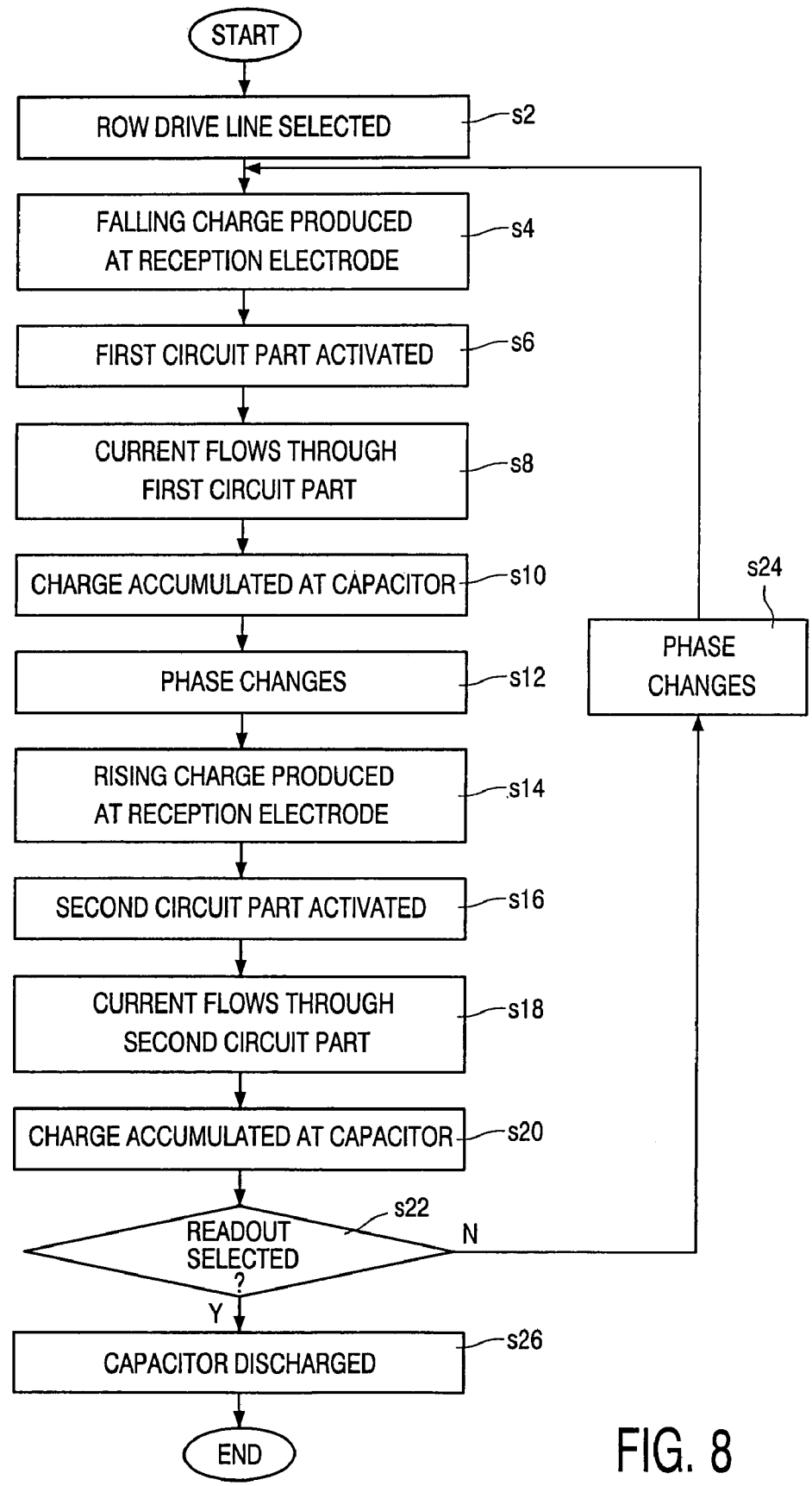
FIG. 8 is a flowchart showing the operation of an electric field sensing arrangement in terms of process steps.
Figure 9A:
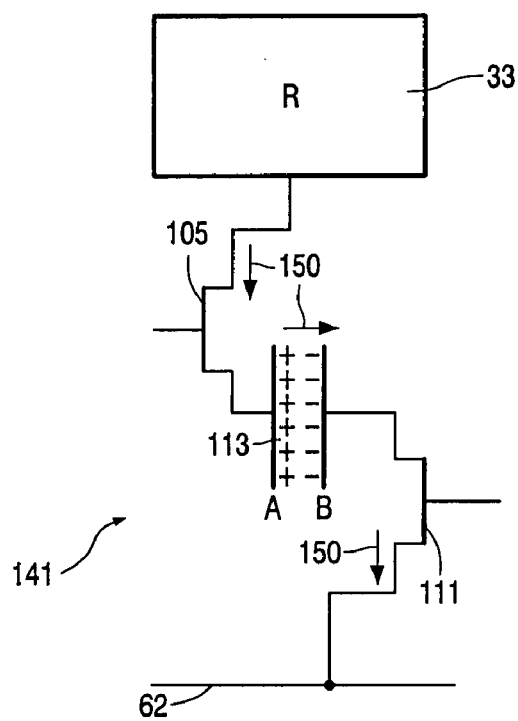
FIGS. 9a and 9b show respectively a first circuit part and a second circuit part that operate separately according to the positive and negative parts of the cycle of the alternating voltage supplied on the phase line mentioned with respect to FIG. 7.
Figure 9B:
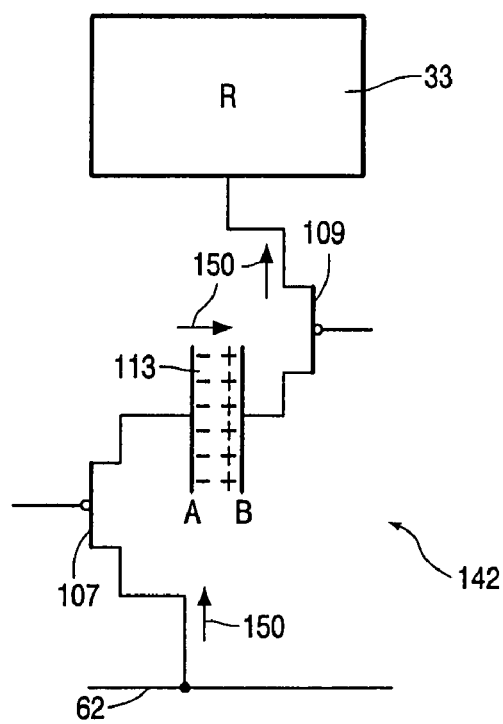

The operation of the above described electric field sensing arrangement will now be described in detail, with reference to FIGS. 7-9. FIG. 7 illustrates qualitatively the alternating voltage supplied on the phase line 80 and resulting responses at the electric field sensing reception electrode 33 and current processing circuit 103. FIG. 8 is a flowchart showing the operation of the electric field sensing arrangement in terms of process steps (note that in order to allow the convenience of a flowchart representation, various steps that in fact occur simultaneously are indicated separately in FIG. 8). FIGS. 9a and 9b show respectively the first circuit part and second circuit part that operate separately according to the positive and negative parts of the cycle of the alternating voltage supplied on the phase line 80.

Considering firstly operation of the device 1 as a whole, the row and column drive lines are operated in conventional display operating fashion, i.e. the row drive lines are driven sequentially and then individual pixels addressed using the column drive lines.

Additionally, for the purpose of operating the electric field sensing electrodes and circuitry, an alternating voltage, $V_T$, is applied to the phase line 80. This may be applied at all times the device 1 is switched on, or may be applied to each phase line only during the time its corresponding row drive line is driven. FIG. 7 shows a plot 120 of this alternating voltage $V_T$, which in this embodiment is a bipolar square wave of +/−10V and frequency 100 kHz. Indicated in FIG. 7 are the positive parts 122 and the negative parts 124 of the cycle of the alternating voltage.

Further details of the implementation of the electric field sensing will now be described for the case of the electric field sensing transmitting electrode 31 and the electric field sensing reception electrode 33. At step s2, the row drive line 61 is selected and driven. This activates the TFT 91, and the alternating voltage applied to the phase line 80 is therefore delivered to the electric field sensing transmission electrode 31, but with the TFT 91 and the capacitor 101 acting as a low pass filter.

As a result of the low-pass filtering provided by TFT 91 and capacitor 101, and the consequential electric field lines produced from the electric field sensing transmission electrode 31, the alternating voltage is capacitively coupled onto the electric field sensing reception electrode 33, thereby generating a charge on that electrode. FIG. 7 further shows a plot 126 of the charge $Q_R$ produced at the electric field sensing reception electrode 33. The plot of the charge $Q_R$ is of saw tooth form, with falling charge parts 128 of the charge cycle ($dQ_R/dt$ negative) corresponding to the positive parts 122 of the cycle of the alternating voltage and rising charge parts 130 of the charge cycle ($dQ_R/dt$ positive) corresponding to the negative parts 124 of the cycle of the alternating voltage.

FIG. 7 further shows a plot 132 of the current $I_R$ that will flow from or to the electric field sensing reception electrode 33 when connected in a circuit due to the changing charge $Q_R$. According to usual current notation convention, the current $IR = -dQ_R/dt$, hence, for falling charge parts 128 of the charge cycle ($dQ_R/dt$ negative) corresponding to the positive parts 122 of the cycle of the alternating voltage, positive parts 134 of the cycle of the current IR are produced and, for rising charge parts 130 of the charge cycle ($dQ_R/dt$ positive) corresponding to the negative parts 124 of the cycle of the alternating voltage, negative parts 136 of the cycle of the current $I_R$ are produced, as shown in FIG. 7.

(For the sake of completeness, it is noted that the plot (not shown) of the voltage ($V_{31}$) on the electric field sensing transmission electrode 31 is of the same shape as, but opposite sign to, the plot 126 of the charge $Q_R$. Also, the current $I_R$ is effectively a current flowing through a capacitor (of capacitance $C_e$) formed by the electric field sensing transmission electrode 31 and the electric field sensing reception electrode 33, given by $I_R = C_e \cdot dV_{31}/dt$.)

So far, the effects produced by the provision of the alternating voltage to the electric field sensing transmission electrode 31 have been described. The alternating voltage has additionally been provided by the phase line 80 to the gates of the TFTs 105, 107, 109, 111 of the current processing circuit 103. This has the effect that (i) during the positive parts 122 of the cycle of the alternating voltage only the two n-type TFTs 105, 111 are activated, such that the current processing circuit 103 operates for the duration of the positive part 122 of the cycle of the alternating voltage as if it consists only of a first circuit part 141, shown in FIG. 9a, comprising the first n-type TFT 105, the capacitor 113, and the second n-type TFT 111; and (ii) during the negative parts 124 of the cycle of the alternating voltage only the two p-type TFTs 107, 109 are activated, such that the current processing circuit 103 operates for the duration of the negative part 124 of the cycle of the alternating voltage as if it consists only of a second circuit part 142, shown in FIG. 9b, comprising the first p-type TFT 107, the capacitor 113, and the second p-type TFT 109. A schematic representation 138 of this alternating operation of the first circuit part 141 and the second circuit part 142 (in phase with the alternating voltage cycle supplied on the phase line 80) is shown in FIG. 7.

The operation over the duration of single positive parts 122 and negative parts 124 of the cycle of the alternating voltage will now be described. Assume we start with a positive part 122 of the cycle of the alternating voltage. At step s4, a falling charge 128 (i.e. $dQ_R/dt$ negative) is produced at the electric field sensing reception electrode 33, as described above. Meanwhile, at step s6, the n-type TFTs 105, 111 are activated effectively providing the first circuit part 141, as described above. Hence, at step s8, a positive part 134 of the cycle of the current, $I_R$, flows through the first circuit part 141. The direction of the flow of positive charge, shown by arrows 150 in FIG. 9a, is from the electric field sensing reception electrode 33 to the row drive line 62. This involves the positive charge flowing from side A to side B of the capacitor 113, thus, at step s10, charge is accumulated at the capacitor 113. Because the positive charge is flowing from side A to side B, the charge sense of this accumulated charge at the capacitor 113 is that of positive charge on side A and negative charge on side B.

Now assume that, at a step s12, the phase of the alternating voltage changes, i.e. the positive part 122 of the cycle of the alternating voltage ends, and a negative part 124 of the cycle of the alternating voltage begins. Now, at step s14, a rising charge 130 (i.e. $dQ_R/dt$ positive) is produced at the electric field sensing reception electrode 33, as described above. Meanwhile, at step s16, the p-type TFTs 107, 109 are activated, effectively providing the second circuit part 142, as described above. Hence, at step s18, a negative part 136 of the cycle of the current, $I_R$, flows. Because this is a negative part of the cycle, the direction of the flow of positive charge, shown also in FIG. 9b by arrows 150, is now from the row drive line 62 to the electric field sensing reception electrode 33.

Although the direction of the flow of the positive charge is now, in terms of the row drive line 62 and the electric field sensing reception electrode 33, opposite to that of the flow of the positive charge in the positive part 122 of the cycle of the alternating voltage (compare the arrows 150 in FIG. 9b with FIG. 9a), nevertheless, because in the second circuit part 142 the capacitor is between the two p-type TFTs 107, 109 whereas in the first circuit part 141 the capacitor is between the two n-type TFTs, the positive charge again flows from side A to side B of the capacitor 113. Thus, at step s20, charge is accumulated at the capacitor 113. Because the positive charge is again flowing from side A to side B, the charge sense of this accumulated charge at the capacitor 113 is again that of positive charge on side A and negative charge on side B, i.e. the charge sense of the accumulated charge at the capacitor 113 during this negative part 124 of the cycle of the alternating voltage is the same as it was during the positive part 122 of the cycle of the alternating voltage.

The charge is accumulated in this additive fashion over further repetitions of the positive and negative cycles of the alternating voltage so as to build up a relatively large charge compared to the small current flowing at any particular moment. The relatively large charge can then be read out and processed by external electronics. This is achieved far more readily with the charge accumulated over the course of a number of cycles than is the case for the original small currents, for example reducing or removing the need to amplify the current. (Note the capacitance of the capacitor 113 is much larger than the capacitance $C_e$ between the electric field sensing transmission electrode 31 and the electric field sensing reception electrode 33.) The accumulated charge is read out by discharging the charge through the column drive line 73. This is implemented, in terms of the flowchart representation of FIG. 8, as follows. At step s22, if readout is not yet selected, the process moves to step s24 where the phase of the alternating voltage returns to the positive part 122 of the cycle and the process continues again from step s4. However, when, at step s22, readout is selected, then the process moves to step s26, at which the phase line 80 and the row drive line 62 are both set high such that the accumulated charge is discharged from the capacitor 113 via the TFT 93 and the column drive line 73 to external electronics.

(It will be appreciated that for ease of representation in a flowchart, step s22 has been shown as occurring at the juncture of a change of phase in the alternating voltage, but in practice readout may be selected at any time during either the positive or negative parts of the cycle of the alternating voltage, or the alternating voltage may be removed from the electric field sensing transmission electrode 31 at some stage and the accumulated charge left at the capacitor 113 and then readout by discharge at a later time.)

Although displacement currents due to other electrostatic events in the device 1 may also flow through the electric field sensing reception electrode 33, because they will be at different frequencies to the alternating voltage supplied by the phase line 80 the charges produced will not be accumulated at the capacitor 113. Likewise, switching noise from e.g. the phase line 80 will be, at least partially, filtered out.

In the above described arrangement, for optimum filtering, the conductivity of the four TFTs 105, 107, 109, 111 is preferably well matched. Differences in mobility, e.g. between the n-type and the p-type TFTs may be corrected by producing TFTs of different widths. An alternative would be to change the drive levels of the alternating voltage on the phase line 80. For example, increasing the voltage magnitude of the negative part 124 of the cycle of the alternating voltage compared to the voltage magnitude of the positive part 122 will increase the conductivity during the negative part of the cycle and the current during both parts of the cycle. This would tend to compensate for any reduction of the p-channel conductivity. Any variations in threshold voltage of the different types of TFT may be compensated similarly. Additionally or alternatively, the larger impedance of the capacitive coupling between the electric field sensing transmission and reception electrodes compared to the TFT impedance may render variations in the TFT impedance non-consequential.

In the above described embodiment, the pixel electrodes, the electric field sensing transmission electrodes, and the electric field sensing reception electrodes are equally spaced and equally sized. However, this need not be the case, and in other embodiments the different types of electrodes may be differently sized and/or differently spaced, and even respective electrodes of a given type may be differently sized and/or spaced.

Also, the particular layout of pixel electrodes, and electric field sensing transmission and reception electrodes (as shown in FIG. 3) employed in the above embodiment is merely one possibility, and in other embodiments any other desired layout may be employed. The following are provided as examples of the very wide overall choice available.

A small variation over the above embodiment is to have more than one pixel electrode, for example 5, 10 or 100 pixel electrodes, between each transmission and reception electrode pair. The number of rows of just pixel electrodes between rows containing electric field sensing transmission and reception electrodes may remain equal to one, as per the above embodiment, but alternatively there may either be no such rows, or the number may be greater than one, and may conveniently be the same as the number of pixel electrodes between each transmission and reception electrode pair.

FIGS. 10*a*-10*d* schematically show other possible layouts, using the same "P", "R" and "T" nomenclature used earlier. In the layout shown in FIG. 10*a*, electric field sensing transmission electrodes are positioned directly adjacent reception electrodes, with a chosen number of pixel electrodes, here four, between each pair of electric field sensing transmission and reception electrodes. In the FIG. 10*a* layout rows of just pixel electrodes are interspersed between rows containing electric field sensing transmission and reception electrodes, and again the number of such rows may be chosen as required, or such rows may be omitted.

Figures 10A, 10B, 10C, 10D:
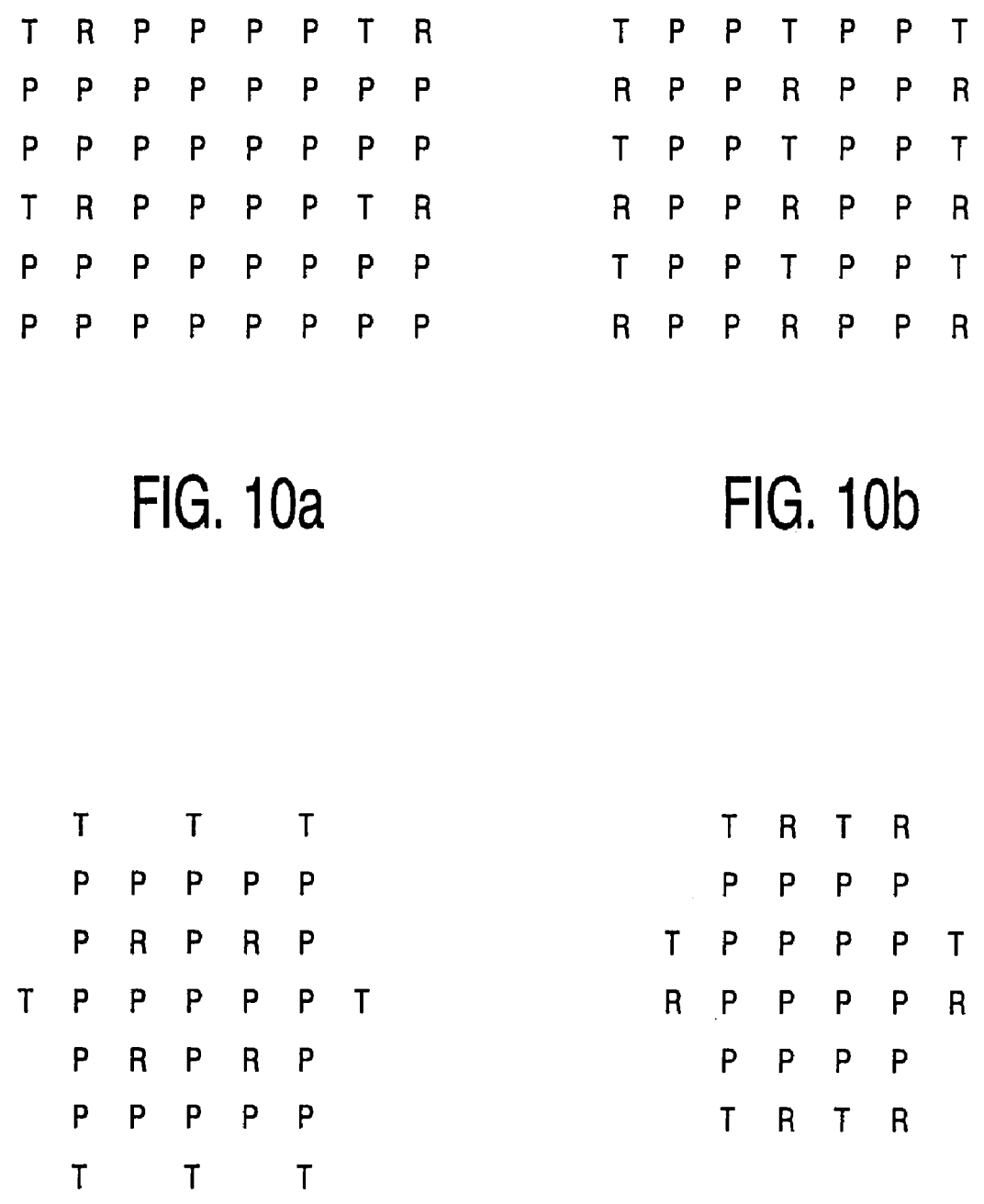

In the layout shown in FIG. 10*b*, each row contains pixel electrodes and either electric field sensing transmission electrodes or electric field sensing reception electrodes. Again, the number of pixel electrodes between respective electric field sensing electrodes may be chosen as required, and intermediate rows of just pixel electrodes may be provided as required.

In the layout shown in FIG. 10*c*, the electric field sensing transmission electrodes are positioned outside the main array of pixel electrodes. The electric field sensing reception electrodes are distributed amongst the pixel electrodes as shown. This example shows a further point, namely that the electric field sensing transmission electrodes and reception electrodes do not need to be in transmission/reception pairs, as the effect of an object on fields sensed by an electric field sensing reception electrode from plural electric field sensing transmission electrodes may be processed as required.

In the layout shown in FIG. 10*d*, the electric field sensing transmission electrodes and the electric field sensing reception electrodes are positioned outside the main array of pixel electrodes.

In the main (FIG. 3) embodiment, the standard liquid crystal display row and column drive lines are employed during the electric field sensing process as described above. Where any of the above mentioned alternative layouts do not allow this, or for some reason are not suitable, additional dedicated lines are provided and used as required. Indeed, such additional dedicated lines may be provided and used when desired, even if the standard liquid crystal display drive lines are capable of being used, e.g. in the main embodiment above.

In the above embodiments, each electric field sensing transmission or reception electrode that is present in the display area defined by the array of pixel electrodes in effect replaces a pixel electrode. Consequently, the display quality is degraded. (For this reason, one advantage of the layouts of FIGS. 10*c* and 10*d* is that by virtue of the electric field sensing electrodes being placed in a periphery region around the outside of the pixel display area, display quality degradation is reduced.)

Another way in which the need to replace pixel electrodes may be reduced or avoided is to use an electrode as both a pixel electrode and an electric field sensing electrode. This is most straightforward in the case of the electric field sensing reception electrodes, because the TFT connected between it and the column drive line (e.g. TFT 93) has the same connections as the TFT (e.g. TFT 92) of a pixel electrode. Thus, with an appropriately modified driving technique, the circuitry of the electric field sensing receiving electrodes can also use those electrodes as pixels. This is therefore particularly advantageous when used with the layout of FIG. 10*c*, as in that layout it is only electric field sensing receiving electrodes that are present in the display area. Nevertheless, a basic approach of using all the electric field sensing electrodes, i.e. both the transmission and reception ones, as a pixel electrode as well, is also possible, but requires additional circuitry, with components activated by a more complex driving scheme according to whether the multi-purpose electrode is at any particular moment being used for electric field sensing or for pixel display.

The possibility to use an electrode as both a pixel electrode and an electric field sensing electrode arises here from the use of a thin film deposited conductor as the electrode. As such, this represents an advantage even if in order to perform both functions, a large amount of separate circuitry is employed for these respective functions, with considerable amounts of redundant circuitry at any moment due to the two functions being shared on a time multiplexed basis.

Nevertheless, a yet more preferred alternative is to use common circuit components for both the pixel function and the electric field sensing function of a single given multi-purpose electrode. This approach may be implemented as follows. The multi-purpose electrode has the alternating voltage supplied to it using the column drive line when in electric field sensing transmission mode. The capacitor (e.g. as per capacitor 101) used as part of the low-pass filter when the electrode is functioning in the electric field sensing transmission mode may be used as a storage capacitor when in pixel display mode. Alternatively, the capacitor may be omitted and the capacitance of the liquid crystal layer may be relied upon to provide the low-pass functionality when the electrode is in electric field sensing transmission mode. Similarly, a capacitor provided for accumulation of the current in electric field sensing reception mode (e.g. as per capacitor 113) may be used as a storage capacitor in pixel display mode.

Another possibility is to have the circuitry required for both transmission and reception in the vicinity of each electric field sensing electrode, and to interchange their functions as required by selective activation of either the transmission related or reception related circuitry. This may be implemented for the case of the electrodes also serving as pixel electrodes, or for when separate pixel electrodes are provided.

It will be appreciated that the current processing circuit 103 employed in the above embodiments represents only one detailed implementation of the current sensing approach of this invention. Firstly, details of the particular circuit 103 may be varied, e.g. the n-type and p-type transistors may be interchanged, or further transistors and/or other circuitry may be employed whilst retaining the main function of the circuit, as is usual for the skilled practitioner in the art of electronic circuit design. More fundamentally, other circuit designs may be used to implement the basic two-phase charge accumulation approach embodied exemplary in the current processing circuit 103 (i.e. in contrast to the conventional amplification method for processing the current). In this respect, another embodiment of a two phase charge accumulation circuit is shown in FIG. 11.

In FIG. 11, the same items as those present in FIGS. 5 and 6 are given the same reference numerals. In this embodiment, the charge processing circuit 103 comprises a transistor, hereinafter referred to as a ratchet transistor 184, a storage capacitor 180, and a leakage resistor 182, connected as shown to each other, the reception electrode 33, the phase line 80 and the row drive line 62 of the next row of electrodes.

The operation of the circuit relies on the fact that in the on-state the time constant of charge leaking through the leakage resistor 182 is long because it is determined by the sum of the storage capacitor 180 and the capacitance between transmission electrode 31 and reception electrode 33, of which the former is much the larger. In the off-state, the time constant of charge leaking away is determined only by the capacitance between transmission electrode 31 and reception electrode 33, which is very small. The time constant is therefore very short.

The circuit operates as follows:

When the voltage on the transmission electrode 31 goes high, due to the connection of the gate of the ratchet transistor 184 to the phase line 80, the ratchet transistor goes conducting. Hence the voltage on the reception electrode 33 and storage capacitor 180 is pulled up.

The ratchet transistor 184 is then switched to a low conducting state (off). The transmission electrode 31 goes low. This means that the voltage on the reception electrode 33 goes low too, but not the voltage on the storage capacitor 180.

Because of the short time constant the low voltage on the reception electrode 33 recovers to zero.

The ratchet transistor 184 is switched to a high conducting state (on), the voltages on the reception electrode 33 and the storage capacitor 180 equalize to a value close to that present on the storage capacitor 180 just before. This is because the capacitance of the storage capacitor 180 is much larger than the capacitance of the reception electrode 33.

The voltage on the transmission electrode 31 once again goes high and the voltage on the reception electrode 33 and the storage capacitor 180 is pulled up further.

This process carries on until a substantial voltage (charge) is stored on the storage capacitor 180 and can be read out via the read-out transistor 93 and column drive line 73 as in the earlier example.

FIG. 12 schematically illustrates a timing diagram for this circuit, and shows, as a function of time t, the voltage 190 applied to the transmission electrode 33, the voltage 192 at the ratchet transistor 184, the voltage 194 at the reception electrode 33, and the voltage 196 at the storage capacitor 180.

It will be appreciated that this circuit is another example of a two-phase charge accumulation circuit for use in accumulating the charge from the reception electrode 33 until it is sufficiently large to be read-out.

In the above embodiments the active matrix layer was implemented using polysilicon technology. It will however be appreciated that other types of active matrix technology may be used, such as amorphous silicon or crystalline silicon.

Furthermore, although the above embodiments all implement the electric field sensing arrangement in conjunction with a liquid crystal display device, it will be appreciated that these embodiments are by way of example only, and the invention may alternatively be implemented in conjunction with any other suitable form of display device allowing electric field sensing transmission and reception electrodes to be accommodated with pixel electrodes and/or allowing processing circuitry for the electric field sensing operation to be provided in a form compatible with the display pixel circuitry, including, for example, plasma, polymer light emitting diode, organic light emitting diode, field emission and switching mirror display devices.

In embodiments described above, many benefits are derived from details contained therein, including the following:

(i) the use of thin film electric field sensing electrodes deposited on a substrate allows a large scale array of electric field sensing electrodes to be implemented, with small distances between each;

(ii) the use of thin film electric field sensing electrodes deposited on a substrate allows convenient layout of the electric field sensing electrodes relative to pixel electrodes of a display;

(iii) the use of the simple charge accumulation circuits such as those described above offers a simpler circuit than conventional operational amplifier circuits used to detect output current;

(iv) the two-phase charge accumulation circuits described above are efficiently implemented in thin film technology, allowing the implementation of many circuits on a single substrate;

(v) the possibility to implement many charge accumulation circuits in thin film technology on a single substrate may be combined with the use of thin film electric field sensing electrodes deposited on a substrate to provide a complete stand-alone electric field sensing arrangement on a substrate;

(vi) a stand-alone electric field sensing arrangement on a substrate may conveniently be used in conjunction with a separate substrate-based display device, e.g. liquid crystal display device, due to the common scale and assembly requirements thereof—for example, a stand-alone electric field sensing arrangement on a substrate may be conveniently assembled adjacent a liquid crystal display device in an electrical product;

(vii) another possibility is to integrate the electric field sensing arrangement and display components in a combined electric field sensing and display device using a single substrate; and so on.

However, these aspects may be implemented singly, or in any combination, providing the corresponding advantages.

Thus it will be appreciated that, for example, the following all represent possible implementations of the invention:

A combined display and user input device, where at least some of the electric field sensing electrodes are formed on the display substrate and/or some of the electric field sensing circuit components are formed on the display substrate.

A sensing circuit for detecting induced current in a receiving electrode of an electric field sensing arrangement, wherein the sensing circuit employs two-phase charge accumulation. As well as thin film implementations of such circuits, the present invention also encompasses such sensing circuits implemented in discrete components, e.g. as a direct replacement of the current detecting circuits employed for example in arrangements such as those disclosed in U.S. Pat. No. 6,025,726.

An electric field sensing device comprising electric field sensing electrodes and electric field sensing circuit components formed from thin layers on a substrate. Such a device may be implemented as described in the main embodiment above, but with all the electrodes (and corresponding circuitry) used as electric field sensing transmission and/or reception electrodes, i.e. replacing all the pixel electrodes and pixel driving circuitry. The above described row and column drive lines may be retained and used to operate the electric field sensing electrodes. Even without the advantages arising from overlap of technology and operation with display devices, many of the above described manufacturing and operational advantages still apply to lesser or greater extent when comparing such a stand-alone electric field sensing device of the present invention with conventional electric field sensing devices, for example those disclosed in U.S. Pat. No. 6,025,726.

By way of example, one application for such a stand-alone electric field sensing input device is shown in FIG. 13, which shows a laptop computer 160. The laptop computer comprises a conventional liquid crystal display device 162. The laptop computer 160 also comprises a separate electric field sensing user input device 164. A main area of the electric field sensing user input device 164 is arranged to function as a virtual keyboard 166, and a small area is arranged to function as a virtual mouse 168.

From reading the present disclosure, other variations and modifications will be apparent to persons skilled in the art. Such variations and modifications may involve equivalent and other features which are already known in the design, manufacture and use of display devices, sensing devices, and component parts thereof, and which may be used instead of or in addition to features already described herein.

Although claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

The invention claimed is:

1. A display and user input device, comprising:
    a display substrate comprising a plate and display components formed on the plate; and
    an electric field sensing arrangement comprising electric field sensing components,
    the electric field sensing components comprising
        one or more electric field transmission electrodes,
        one or more electric field reception electrodes, and
        electric field sensing circuit components that include:
            one or more driver circuits that are configured to drive the one or more electric field transmission electrodes based on an alternating drive signal, and
            one or more sensing circuits that are configured to sense induced current in the one or more electric field reception electrodes;
    wherein one or more of the electric field sensing components are formed on the plate, and
    at least one sensing circuit of the one or more sensing circuits includes:
        a charge accumulator, and
        a switching circuit that is configured to couple at least one receive electrode of the one or more electric field reception electrodes to the charge accumulator, based on the alternating drive signal.

2. A device according to claim 1, wherein
the electric field transmission and reception electrodes are formed on the plate.

3. A device according to claim 2, wherein
the display components comprise pixel electrodes, and wherein
the electric field transmission electrodes, the electric field reception electrodes and the pixel electrodes are formed on the plate from a same layer of conductor.

4. A device according to claim 3, wherein
at least some of the electric field transmission electrodes and the electric field reception electrodes are interspersed amongst an array of the pixel electrodes.

5. A device according to claim 3, wherein
at least some of the electric field reception electrodes also serve as at least some of the pixel electrodes.

6. A device according to claim 1, wherein
at least some of the electric field sensing circuit components are formed on the plate.

7. A device according to claim 6, wherein
the display components comprise thin film display driving circuit components, and wherein
the electric field sensing circuit components and the thin film display driving circuit components are formed on the plate either from at least one shared thin film layer or during at least one shared fabrication process.

8. A device according to any preceding claim, wherein
the display components comprise row and column lines and
the electric field sensing arrangement is arranged to use the row and/or the column lines.

9. A device according to claim 1, wherein
the sensing circuits are each arranged such that in operation the induced current is delivered to each charge accumulator such as to provide a net charge at the charge accumulator that forms a measure of the current induced in the at least one receive electrode coupled to the charge accumulator.

10. A device according to claim 1, wherein
the at least one switching circuit is configured to alternately couple the at least one receive electrode to the charge accumulator in synchronization with the alternating drive signal, so that the at least one receive electrode is coupled to the charge accumulator in a first charging sense when the alternating drive signal is positive, and in an opposite charging sense when the alternating drive signal is negative.

11. A device according to claim 10, wherein
the at least one switching circuit includes:
a first n-type transistor,
a second n-type transistor,
a first p-type transistor, and
a second p-type transistor,
each transistor having a gate, a first terminal, and a second terminal;
the accumulator includes a capacitor; and,
the gates of each of the transistors are connected to each other and to the alternating drive signal;
the first terminal of the first n-type transistor and the first terminal of the second p-type transistor are connected to each other and to the receive electrode;
the second terminal of the first n-type transistor and the first terminal of the first p-type transistor are connected to each other and to a first side of the capacitor;
the second terminal of the first p-type transistor and the second terminal of the second n-type transistor are connected to each other and to a further line; and
the second terminal of the second p-type transistor and the first terminal of the second n-type transistor are connected to each other and to a second side of the capacitor.

12. A method of using a sensing circuit to detect induced current in a receiving electrode of an electric field sensing arrangement, the method comprising:
delivering current induced at the receiving electrode to a charge accumulator of the sensing circuit;
inputting an alternating current drive signal, as supplied to a transmitting electrode of the electric field sensing arrangement, to the sensing circuit; and
using the drive signal to vary operation of the sensing circuit when the drive signal is positive compared to when the drive signal is negative;
wherein
the charge accumulator, the means for delivering induced current, the means for receiving an alternating current drive signal, and the means for using the drive signal to vary operation of the sensing circuit are arranged such that the induced current delivered to the charge accumulator provides a net charge at the charge accumulator, the net charge being a measure of the current induced in the receiving electrode.

13. A method according to claim 12, wherein:
the step of using the drive signal to vary operation of the sensing circuit when the drive signal is positive compared to when the drive signal is negative comprises
using the drive signal to activate a first part of the sensing circuit when the drive signal is positive and
using the drive signal to activate a second part of the sensing circuit when the drive signal is negative;
the first part of the sensing circuit delivering, when activated, current induced at the receiving electrode to the charge accumulator; and
the second part of the sensing circuit delivering, when activated, current induced at the receiving electrode to the charge accumulator;
the first part of the sensing circuit, the second part of the sensing circuit, and the charge accumulator being arranged such that the induced current delivered by each of the first and second parts of the sensing circuit is delivered to the charge accumulator with the same charge sense.

14. A sensing circuit for detecting induced current in a receiving electrode of an electric field sensing arrangement, the sensing circuit comprising:
a charge accumulation means;
means for delivering current induced at the receiving electrode to the charge accumulation means;
means for receiving an alternating current drive signal, as supplied to a transmitting electrode of the electric field sensing arrangement; and
means for using the drive signal to vary operation of the sensing circuit when the drive signal is positive compared to when the drive signal is negative;
wherein
the charge accumulation means, the means for delivering induced current, the means for receiving an alternating current drive signal, and the means for using the drive signal to vary operation of the sensing circuit are arranged such that in operation the induced current is delivered to the charge accumulation means such as to provide a net charge at the charge accumulation means, the net charge being a measure of the current induced in the receiving electrode.

15. A sensing circuit according to claim 14, wherein:
the means for using the drive signal to vary operation of the sensing circuit when the drive signal is positive compared to when the drive signal is negative comprises
means for using the drive signal to activate a first part of the sensing circuit when the drive signal is positive and
means for using the drive signal to activate a second part of the sensing circuit when the drive signal is negative;
the first part of the sensing circuit comprising means for delivering, when activated, current induced at the receiving electrode to the charge accumulation means; and
the second part of the sensing circuit comprising means for delivering, when activated, current induced at the receiving electrode to the charge accumulation means;
the first part of the sensing circuit, the second part of the sensing circuit, and the charge accumulation means being arranged such that in operation the induced current delivered by each of the first and second parts of the sensing circuit is delivered to the charge accumulation means with the same charge sense.

16. A sensing circuit according to claim 15, wherein:
the sensing circuit comprises
a first n-type transistor,
a second n-type transistor,
a first p-type transistor,
a second p-type transistor, and
the accumulation means;
the accumulation means comprises a capacitor;
the gates of the transistors are connected to each other and to the means for receiving an alternating current drive signal;
a first terminal of the first n-type transistor and a first terminal of the second p-type transistor are connected to each other and to the electric field sensing reception electrode;
a second terminal of the first n-type transistor and a first terminal of the first p-type transistor are connected to each other and to a first side of the capacitor;

a second terminal of the first p-type transistor and a second terminal of the second n-type transistor are connected to each other and to a further line; and a second terminal of the second p-type transistor and a first terminal of the second n-type transistor are connected to each other and to the second side of the capacitor;

such that the first part of the sensing circuit comprises the first n-type transistor, the capacitor and the second n-type transistor; and the second circuit part of the sensing circuit comprises the first p-type transistor, the capacitor, and the second p-type transistor.

17. An electric field sensing device, comprising:
a plate;
a plurality of electric field transmission electrodes formed on the plate;
a plurality of electric field reception electrodes formed on the plate; and
electric field sensing circuit components comprising:
   one or more driver circuits that are configured to drive the plurality of electric field transmission electrodes based on an alternating drive signal, and
   one or more sensing circuits that are configured to sense currents induced in the plurality of electric field reception electrodes, formed from thin film layers on the plate;
wherein
at least one sensing circuit of the one or more sensing circuits includes:
   a charge accumulator, and
   a switching circuit that is configured to couple at least one of the one or more electric field reception electrodes to the charge accumulator, based on the alternating drive signal.

18. A device according to claim 17, wherein
the plurality of electric field reception electrodes are arranged on the plate in a two-dimensional array.

19. A sensing circuit comprising:
a transmit electrode that is driven by an alternating drive signal;
a receive electrode that is configured to receive transmitted signals from the transmit electrode;
a charge accumulator; and
a switching circuit that is configured to couple the receive electrode to the charge accumulator, based on the alternating drive signal, to provide a net charge to the charge accumulator that provides a measure of coupling between the transmit electrode and the receive electrode.

20. A sensing circuit according to claim 19, wherein
the switching circuit is configured to alternately couple the receive electrode to the charge accumulator in synchronization with the alternating drive signal, so that the receive electrode is coupled to the charge accumulator in a first charging sense when the alternating drive signal is positive, and in an opposite charging sense when the alternating drive signal is negative.

21. A sensing circuit according to claim 20, wherein
the switching circuit includes:
   a first n-type transistor,
   a second n-type transistor,
   a first p-type transistor, and
   a second p-type transistor,
   each transistor having a gate, a first terminal, and a second terminal;
the accumulator includes a capacitor;
the gates of each of the transistors are connected to each other and to the alternating drive signal;
the first terminal of the first n-type transistor and the first terminal of the second p-type transistor are connected to each other and to the receive electrode;
the second terminal of the first n-type transistor and the first terminal of the first p-type transistor are connected to each other and to a first side of the capacitor;
the second terminal of the first p-type transistor and the second terminal of the second n-type transistor are connected to each other and to a further line; and
the second terminal of the second p-type transistor and the first terminal of the second n-type transistor are connected to each other and to a second side of the capacitor.

22. A display and user input device, comprising:
a display substrate comprising a plate and display components formed on the plate; and
an electric field sensing arrangement comprising:
   one or more transmit electrodes that are driven by an alternating drive signal;
   a plurality of receive electrodes that are configured to receive transmitted signals from the one or more transmit electrodes; and
   one or more current sensors that are configured to measure induced current in the plurality of receive electrodes,
wherein:
the plurality of receive electrodes are arranged as a two-dimensional array of electrode areas on the plate;
the display components comprise pixel electrodes; at least some of the one or more receive electrodes are interspersed amongst an array of the pixel electrodes; and
at least some of the one or more receiver electrodes also serve as at least some of the pixel electrodes.

23. A device according to claim 22, wherein
the display components comprise row and column lines and
the switching circuits are arranged to use the row and/or the column lines.

* * * * *